US007789085B2

(12) United States Patent
Vogt

(10) Patent No.: US 7,789,085 B2
(45) Date of Patent: Sep. 7, 2010

(54) PRESENTATION ARRANGEMENT FOR AN OXYGEN MASK OR A PULL FLAG

(75) Inventor: Thomas Vogt, Hamburg (DE)

(73) Assignee: Airbus Deutschland GmbH (DE)

( * ) Notice: Subject to any disclaimer, the term of this patent is extended or adjusted under 35 U.S.C. 154(b) by 1017 days.

(21) Appl. No.: 11/355,675

(22) Filed: Feb. 16, 2006

(65) Prior Publication Data

US 2006/0201510 A1    Sep. 14, 2006

Related U.S. Application Data

(63) Continuation of application No. PCT/EP2004/008797, filed on Aug. 5, 2004.

(30) Foreign Application Priority Data

Aug. 16, 2003   (DE) ................................ 103 37 694

(51) Int. Cl.
*A62B 18/08*      (2006.01)
(52) U.S. Cl. .............................. 128/206.27; 128/206.21
(58) Field of Classification Search ............ 128/206.27, 128/206.21, 206.24, 206.28, 204.29, 205.11
See application file for complete search history.

(56) References Cited

U.S. PATENT DOCUMENTS

| 4,154,237 | A |   | 5/1979 | Courter |               |
|-----------|---|---|--------|---------|---------------|
| 4,481,945 | A | * | 11/1984 | Levine | 128/206.27 |
| 5,078,343 | A | * | 1/1992 | Howlett | 244/118.5 |
| 5,199,423 | A | * | 4/1993 | Harral et al. | 128/202.26 |
| 5,809,999 | A | * | 9/1998 | Lang | 128/200.24 |
| 6,318,364 | B1 | * | 11/2001 | Ford et al. | 128/204.18 |

FOREIGN PATENT DOCUMENTS

DE         100 33 423 A1    1/2002

* cited by examiner

*Primary Examiner*—Steven O Douglas
*Assistant Examiner*—Colin Stuart
(74) *Attorney, Agent, or Firm*—Lerner, David, Littenberg, Krumholz & Mentlik, LLP

(57) ABSTRACT

A presentation arrangement for presenting an oxygen mask or pull flag including an inflatable lever wherein for presenting the oxygen mask or pull flag at a preset first location, the inflatable lever is inflated such that the oxygen mask or pull flag is located at the first location.

13 Claims, 2 Drawing Sheets

PRESENTATION ARRANGEMENT FOR AN OXYGEN MASK OR A PULL FLAG

CROSS-REFERENCE TO RELATED APPLICATIONS

The present application is a continuation of PCT Patent Application Serial No. PCT/EP2004/008797, filed Aug. 5, 2004, claiming priority of German Patent Application Serial No. 103 37 694.1, filed Aug. 16, 2003, incorporated herein by reference in their entirety.

BACKGROUND OF THE INVENTION

The present invention relates to the presentation of an oxygen mask or pull flag. In particular, the present invention relates to a presentation arrangement for presenting an oxygen mask or pull flag, to a system for presenting an oxygen mask or pull flag in an aircraft and to a method of presenting an oxygen mask or pull flag.

In today's commercial aircrafts, oxygen masks are provided which fall out of an overhead dispensing unit in case of a loss of cabin pressure. Usually the oxygen masks are connected to the oxygen system located in the personal service channel over the passengers seats by means of a tube.

In case there is a loss of cabin pressure or in case the oxygen system is activated otherwise, a lid closing the dispensing unit containing the oxygen masks opens and the oxygen masks fall out of the dispensing unit.

In case a passenger's seat is arranged at a distance from the next personal service channel or from the next dispensing unit of oxygen masks, there may be a problem for the person seated in such a seat to reach the oxygen mask without leaving the seat. A position of such a seat been located at a certain distance from the next oxygen mask dispensing unit is referred to as a seat at "an extreme location". In today's aircrafts seats at such an extreme location are avoided.

SUMMARY OF THE INVENTION

According to an exemplary embodiment of the present invention, a presentation arrangement for presenting an oxygen mask or pull flag is provided comprising an inflatable lever. The inflatable lever may be connectable to the oxygen mask or pull flag. For presenting the oxygen mask or pull flag at a preset location such as, for example, in proximity of a passenger's seat located as an extreme location, the inflatable lever may be inflatable such that the oxygen mask or pull flag is located at the desired location.

According to an exemplary embodiment of the present invention, an improved availability of oxygen masks may be allowed.

This may increase a distance at which a seat may be located from the next oxygen mask dispensing unit while ensuring that on such a seat the oxygen mask may be reached by a passenger without leaving the seat. Furthermore, due to the fact that this exemplary embodiment of the present invention not requires any moving mechanical parts, a presentation arrangement may be provided which does not require a lot of service. Furthermore, due to the fact that the inflatable lever may be very lightweight, a very lightweighted presentation arrangement may be provided. Furthermore, due to the fact that the inflatable lever may be preformed in any desired way, the location at which the oxygen mask will be presented can be set or determined three-dimensionally. Also, a very reliable presentation arrangement may be provided.

Furthermore, due to the fact that the inflated inflatable lever is not a fixed lever, a potential for a physical injury may be reduced.

According to another exemplary embodiment of the present invention, the inflatable lever is connectable to an oxygen system. By this, an automatic inflating of the inflatable lever may be provided. Thus, when the oxygen system is activated, the inflatable lever may automatically be inflated such that the oxygen mask or pull flag is transferred to the preset location.

This may allow for a simple control of the inflatable lever and for a simple handling of the overall system. Also, this may allow that the presentation arrangement according to this exemplary embodiment of the present invention may be refitted into older aircrafts.

According to another exemplary embodiment of the present invention, the inflatable lever is foldable or rollable. By this, the inflatable lever may be folded or rolled such that a storing volume is reduced. This may allow for a dispensing unit having relatively small dimensions.

According to another exemplary embodiment of the present invention, the inflatable lever is installed in the dispensing unit that is connected to a personal service channel in an aircraft. Thus, in case for example the cabin pressure of the passenger cabin falls below a preset level or the oxygen system is activated, the inflatable lever may be inflated for transferring the oxygen mask or pull flag close to a passenger's seat. By this, even seats located in an extreme location may be reached such that a passenger located in such a seat may reach the oxygen mask without leaving the seat.

According to another exemplary embodiment of the present invention, a gas for inflating the inflatable lever may be air or oxygen. According to a variant of this exemplary embodiment, other types of gas or even foam material may be used to inflate the inflatable lever. The inflatable lever may be made of a flexible material such as rubber or plastics.

According to another exemplary embodiment of the present invention, the inflatable lever is provided with a gas flow control which is adapted to control a gas flow for inflating the inflatable lever. By this, the inflating of the inflatable lever may be controlled such that a time required to inflate the inflatable lever may be set. By this, it may be ensured that no injury or damage occurs due to a rapid inflating of the inflatable lever.

According to another exemplary embodiment of the present invention, the inflatable lever may further be provided with a valve. This valve may be deactivated to deflate the inflatable lever. By activating this valve, for example a passenger who already fixed the oxygen mask to his face may deflate the inflatable lever such that the inflatable lever is not an obstacle.

According to another exemplary embodiment of the present invention, the inflatable lever is a preformed hose. The preforming may be such that when the inflatable lever is essentially inflated, the oxygen mask or pull flag may be located close to a desired location such as close to a passenger's seat. A preforming of the inflatable lever may allow to three-dimensionally locate the oxygen mask.

According to another exemplary embodiment of the present invention, a system for presenting an oxygen mask or pull flag in an aircraft is provided wherein the inflatable lever is stored in a dispensing unit before it is inflated and wherein when the inflatable lever is inflated the oxygen mask or pull flag is located in proximity to a passenger's seat.

This may provide for a lightweight presentation arrangement allowing for a three-dimensional locating of an oxygen mask without requiring moving and/or electrical parts.

According to another exemplary embodiment of the present invention, a method is provided for presenting an oxygen mask or pull flag. According to this method, an inflatable lever is provided wherein a first portion of the inflatable lever is connected to the oxygen mask or pull flag. Then, the inflatable lever may be inflated for presenting or transferring the oxygen mask or pull flag to the preset location.

BRIEF DESCRIPTION OF THE DRAWINGS

Further exemplary embodiments of the present invention will be described in the following with reference to the following figures.

DETAILED DESCRIPTION

Figure 1:
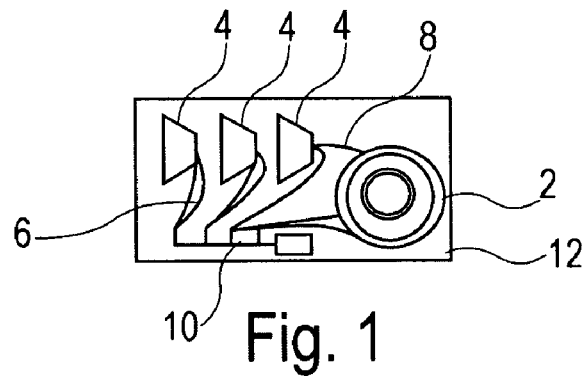
FIG. 1 shows a top view of an exemplary embodiment of a presentation arrangement according to the present invention.

In the following description of FIGS. 1-5 the same reference numerals will be used for referring to the same or corresponding elements.

FIG. 1 shows a top view of an exemplary embodiment of a presentation arrangement according to the present invention. Reference numeral 2 in FIG. 1 designates an inflatable lever that is rolled or folded such that a volume of the inflatable lever 2 is reduced or minimized when it is stored in a dispensing unit 12. Reference numeral 4 designates oxygen masks that are connected to a distribution manifold 10 by means of lines 6 or hoses 32. The lines be used to activate the oxygen flow to the hose 32. The hoses 32 may be used for conducting the oxygen to the mask 4. Furthermore, there may be provided another line 8 between one end of the inflatable lever 2 and the oxygen mask 4 or pull flag 5. The other end of the inflatable lever 2 may be connected to an oxygen system not shown in FIG. 1. The dispensing unit 12 may be closed by means of a lid (not shown in FIG. 1) which may be opened when the inflatable lever 2 is inflated. Such system for presenting an oxygen mask or pull flag may be provided in an aircraft.

Figure 2:
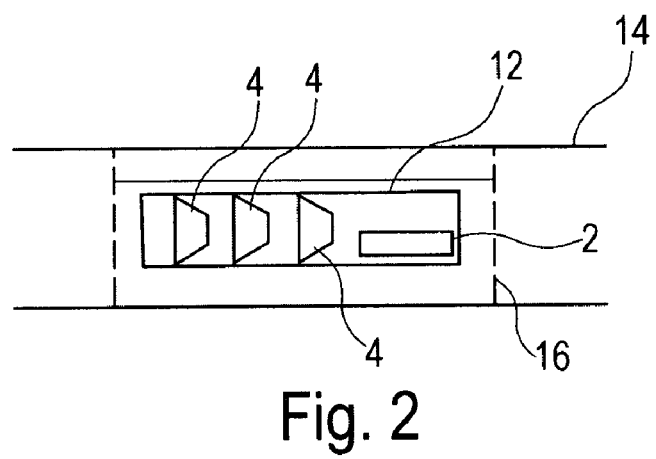
FIG. 2 shows a cross sectional side view of an exemplary embodiment of a presentation arrangement according to the present invention.

FIG. 2 shows a cross sectional side view of another exemplary embodiment of a presentation arrangement according to the present invention. The presentation arrangement depicted in FIG. 2 is arranged in a personal service channel (PSC) of a passenger aircraft. The personal service channel is designated with reference numeral 14. There may be provided a lid 16 for covering the system for presenting the oxygen mask or pull flag. In case a cabin pressure falls below a preset level or in case an oxygen system (not shown) is activated in the aircraft, the lid 16 opens and the oxygen masks 4 fall out of the dispensing unit 12. An oxygen mask 4 or pull flag connected to the inflatable lever 2 which, in case the oxygen system is activated, is inflated, is automatically be transferred by the inflatable lever 2 to a desired location. This desired location is predetermined by a form of the inflatable lever. Such preforming of the inflatable lever may allow that the oxygen mask or pull flag associated with a respective inflatable lever may be located or transferred three-dimensionally in a region covered by the inflatable lever 2.

Figure 3:
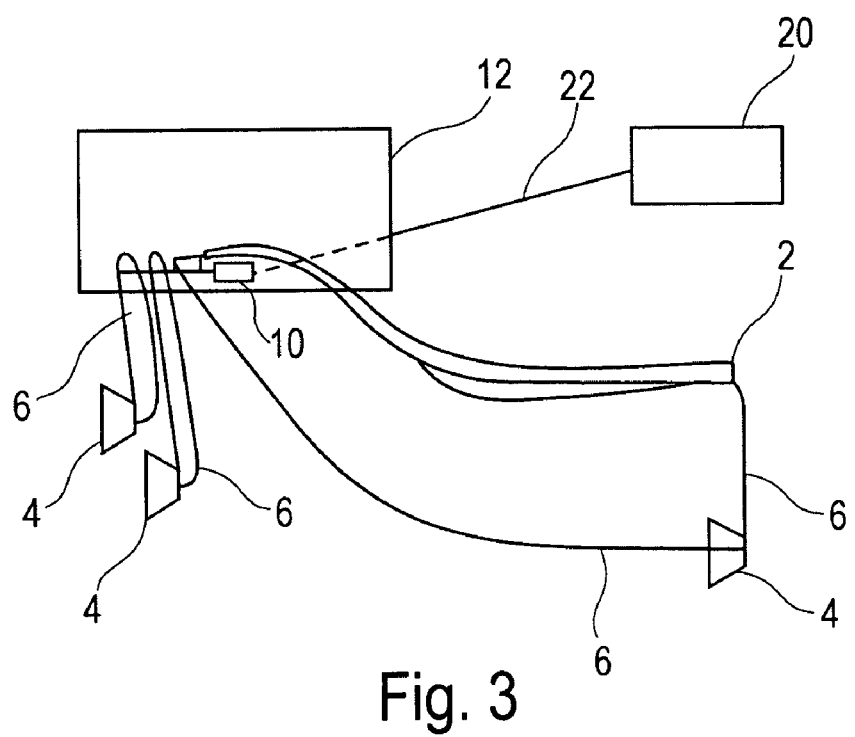
FIG. 3 shows a side view of an exemplary embodiment of a presentation arrangement according to the present invention where the inflatable lever is inflated.

FIG. 3 shows a simplified view of the presentation arrangement when the oxygen system 20 is activated or when the inflatable lever 2 is inflated.

Reference numeral 20 designates an oxygen system which may be connected to the distribution manifold 10 and therewith to the oxygen masks 4 by means of hose or wire 22. As may be taken from FIG. 3, when the oxygen system is activated the two first oxygen masks from the left just fell out of the dispensing unit 12 and dangle from the distribution manifold 10 held by a line and/or oxygen tube 6. In contrast, the oxygen mask 4 on the right side of FIG. 3 was transferred a significant distance to the right and may now be reached even from a seat located at an extreme location. As may be taken from FIG. 3, the inflated inflatable lever may have the form of an S. However, as appeared to the skilled person, the inflatable lever 2 may be preformed in almost any suitable form. A distance that may be covered by the inflatable lever 2 is determined by a pressure provided by the oxygen system 20 for inflating the inflatable lever 2 and by the weight of the oxygen mask 4 and the oxygen tube 6.

It should be noted that for providing the oxygen from the distribution manifold 10 to the oxygen mask, a simple tube or hose may be sufficient. However, in addition to the tube or hose, a string or cord may be provided.

Figure 4:
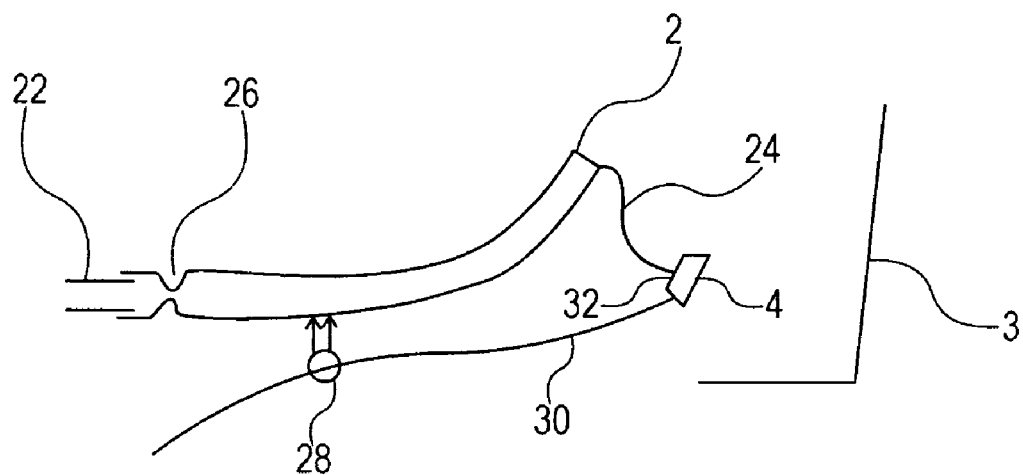
FIG. 4 shows a simplified view of another exemplary embodiment of a presentation arrangement according to the present invention.

FIG. 4 shows a simplified sketch of another exemplary embodiment of the presentation arrangement according to the present invention. As may be taken from FIG. 4, one end of the inflatable lever 2 is connected to the hose or wire 22 which may be connected to the gaseous oxygen system, chemical oxygen generator or external or internal inflatable gas generator. Reference numeral 26 in FIG. 4 designates a gas flow control which may reduce an inflow of gas provided via the hose or wire 22 to the inflatable lever 2. By this, a time required to inflate the inflatable lever may be controlled such that the inflating of the inflatable lever is not too fast such that, for example, damage or injury caused by too fast inflating of the inflatable lever may be avoided. The oxygen mask 4 may be connected to an end of the inflatable lever 2 by means of a cord or string. Furthermore, there may be provided a cord or string 30 which may be referred to as activation line. In addition to cords 24 and 30, a oxygen tube or hose may be provided for providing the oxygen to the oxygen mask. The end of the oxygen tube 32 may be connected to the inflatable lever 2 or to the distribution manifold 10 or to the hose or wire 22.

Reference numeral 28 designates a valve provided in the inflatable lever 2. As may be taken from FIG. 4, the string 30 may be connected to the valve 28. This allows, that when a person pulls the activation line or string 30, the valve 28 is activated such that air escapes from the inflatable lever 2. Thus, when a person sitting at a passenger's seat 3 activates the activation 30 i.e. pulls the activation line 30, the valve 28 is open and the inflatable lever 2 deflates. By this, it may be ensured that the inflatable lever 2 does not hinder or restrict a view or a movement of the passenger in seat 3.

Thus, according to another exemplary embodiment of the present invention, a presentation arrangement is provided comprising an inflatable hose which is preformed such that when it is inflated, it has a predefined form. One end of this hose is connected to the oxygen container and the other end is connected to the oxygen mask or the pull flag. The oxygen mask or pull flag may be connected to the inflatable hose by means of a string or cord.

In case the inflatable hose is stored, it is folded or rolled and may, for example, be stored in the oxygen container. In case the oxygen system is activated, a pressure in the oxygen distribution system increases. This pressure may for example also be used to open the lid of the dispensing unit or oxygen container. At the same time, the pressure is provided to the inflatable hose which inflates.

As mentioned above, to avoid a too rapid inflation, a flow control may be provided such that an inflating of the inflatable hose may be controlled.

Furthermore, in order to avoid that the inflated hose causes any obstructions or obstacles in the cabin of the aircraft, for example, by projecting into an escape route, a further valve may be provided which may be activated by a passenger or by a crew lever for deflating the inflatable hose.

Advantageously, the pre-forming of the inflatable hose allows a three-dimensional locating or orientating of the mask or pull flag. This may also allow for a more flexible seating arrangement in an aircraft may allow to more intensively use a space provided in an aircraft.

In a variant, the inflatable hose may be connected to a gaseous oxygen system but may also be used in combination with a chemical oxygen system where the inflatable lever or hose is connected to a chemical oxygen generator or external or internal inflatable gas generator.

Figure 5:
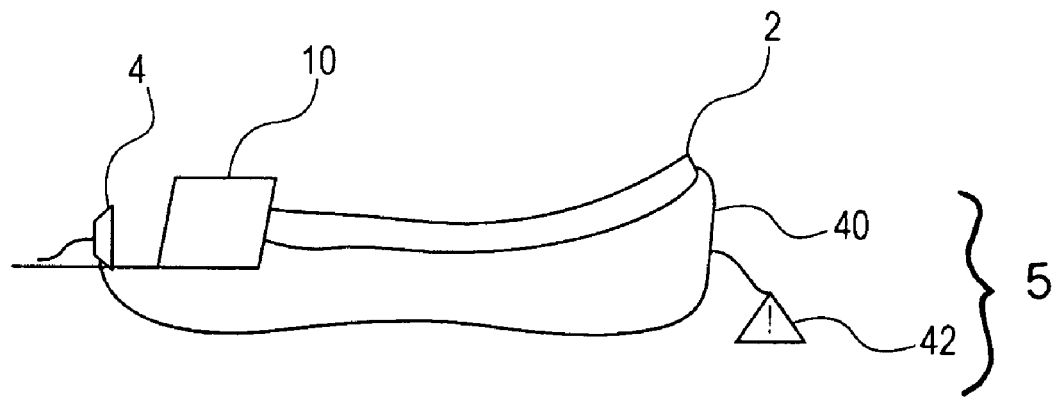
FIG. 5 shows a simplified view of another exemplary embodiment of a presentation arrangement according to the present invention.

FIG. 5 shows another exemplary embodiment of a presentation arrangement according to the present invention. As may be taken from FIG. 5, a line 40 is connected to the protruding end of the inflatable lever or member 2. Approximate to this end of the lever 2, there is a flag 42 attached to the line 40. The line 40 and the flag 42 may be referred to as pullflag 5. In case the oxygen system is activated, the lever 2 transports the line 40 and the flag 42, which may have the text "pull" on it, to the passenger in the seat. By pulling the line 40 or the flag 42 (and therewith the line) the passenger may pull the mask 4 out of its storage. The pulling of line 40/flag 42 also may activate the oxygen supply to the mask 4. Advantageously, this may ensure that the passenger puts on the mask 4 and activates the oxygen supply to mask 4. A situation where a passenger puts on the mask 4 without activating the oxygen supply may be avoided. Due to the fact that only a flag 42 is transported to the passenger, a risk of injury may be minimized. Furthermore, in comparison to the mask 4, the flag 42 to be transferred to the passenger has a lower weight.

It should be noted that it is obvious to skilled persons that features described in different embodiments with respect of FIGS. 1-5 may be used in combination with each other. Furthermore, it should be noted that "comprising" does not exclude other elements or steps and that "a" or "an" does exclude a plurality. Furthermore, it should be noted that any reference signs in the claims shall not be construed as limiting the scope. Also elements described in association with different embodiments may be combined.

The invention claimed is:

1. A presentation arrangement for presenting an oxygen mask or pullflag, the presentation arrangement comprising:
   an inflatable lever;
   an oxygen mask;
   a pullflag including a line which is connected to a protruding end of the inflatable lever and connected to the oxygen mask, and the pullflag also including a flag;
   wherein the inflatable lever is connectable to the pullflag; and wherein, for presenting the pullflag at a preset first location, the inflatable lever is inflatable such that the pullflag is located at the first location;
   wherein the presentation arrangement is arranged in a personal service channel of a passenger aircraft; and
   wherein the pullflag is adapted in such a way that, by pulling the line or the flag, the oxygen mask is pulled out of its storage in the personal service channel.

2. The presentation arrangement of claim 1,
   wherein a portion of the inflatable lever is connectable to an oxygen system such that, when the oxygen system is activated, the inflatable lever is inflated such that the oxygen mask or pullflag is transferred to the first location.

3. The presentation arrangement of claim 1,
   wherein the inflatable lever is at least one of foldable and rollable for storing in a dispensing unit such that a volume of the inflatable lever is reducible for storing.

4. The presentation arrangement of claim 1,
   wherein the inflatable lever is connectable to an oxygen system of an aircraft;
   wherein the oxygen system is adapted for providing oxygen to passengers;
   wherein the inflatable lever is at least one of folded and rolled when the oxygen system is deactivated;
   wherein the inflatable lever is stored in a personal service channel of the aircraft; and
   wherein the inflatable lever is inflated for transferring the oxygen mask or pullflag close to a passenger's seat when the oxygen system is activated.

5. The presentation arrangement of claim 2,
   wherein a gas for inflating the inflatable lever is provided by the oxygen system; and
   wherein the gas is air or oxygen.

6. The presentation arrangement of claim 1,
   wherein the inflatable lever is provided with a gas flow control; and
   wherein the gas flow control is adapted to control a gas flow for inflating the inflatable lever such that a time required to inflate the inflatable lever is controllable by the gas flow control.

7. The presentation arrangement of claim 1,
   wherein the inflatable lever is further provided with a valve.

8. The presentation arrangement of claim 1,
   wherein the inflatable lever is a preformed hose;
   wherein one end of the hose is attachable to a source of gas for inflating the inflatable lever;
   wherein the source of gas is at a second location;
   wherein the inflatable lever is arranged adjacent to the second location when it is not inflated; and
   wherein the preforming is such that when the inflatable lever is essentially inflated, the oxygen mask or pullflag is located at the first location.

9. A system for presenting an oxygen mask or pullflag in an aircraft, the system comprising:
   a presentation arrangement for presenting a pullflag, the presentation arrangement including an inflatable lever, an oxygen mask, a pullflag including a line which is connected to a protruding end of the inflatable lever and connected to the oxygen mask and a flag; wherein the inflatable lever is connectable to the pullflag, and wherein, for presenting the pullflag at a preset first location, the inflatable lever is inflatable such that the pullflag is located at the first location, wherein the presentation arrangement is in a personal service channel of a passenger aircraft; and wherein the pullflag is adapted in such a way that, by pulling the line or the flag, the oxygen mask is pulled out of its storage in the personal service channel;
   a dispensing unit;
   wherein the inflatable lever is stored in the dispensing unit before it is inflated; and wherein, when the inflatable lever is inflated, the pullflag is located in proximity to a passenger's seat.

10. The system of claim 9,
wherein the inflatable lever is connected to an oxygen system of the aircraft such that when the oxygen system is activated, the inflatable lever is inflated.

11. A method of presenting an oxygen mask or pullflag comprising:
providing an inflatable lever;
wherein a first portion of the inflatable lever is connected to a pullflag including a line and a flag; and
inflating the inflatable lever for presenting the pullflag at a preset location; and
pulling a line or a flag by means of which a oxygen mask is pulled out of its storage.

12. The method of claim 11,
wherein a second portion of the inflatable lever is connected to an oxygen system, and
activating the oxygen system such that the inflatable lever is inflated such that the oxygen mask or pullflag is transferred to the preset first location.

13. The method of claim 11, wherein the inflatable lever is arranged in a personal service channel of a passenger aircraft.

* * * * *